United States Patent
Park

(10) Patent No.: US 9,658,955 B2
(45) Date of Patent: May 23, 2017

(54) DATA STORAGE DEVICE AND OPERATING METHOD THEREOF

(71) Applicant: SK hynix Inc., Gyeonggi-do (KR)

(72) Inventor: Jeen Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 99 days.

(21) Appl. No.: 14/747,850

(22) Filed: Jun. 23, 2015

(65) Prior Publication Data

US 2016/0253266 A1 Sep. 1, 2016

(30) Foreign Application Priority Data

Feb. 26, 2015 (KR) .......................... 10-2015-0027352

(51) Int. Cl.
*G06F 12/10* (2016.01)
*G06F 12/02* (2006.01)
*G06F 12/0862* (2016.01)

(52) U.S. Cl.
CPC ...... *G06F 12/0238* (2013.01); *G06F 12/0862* (2013.01); *G06F 2212/171* (2013.01); *G06F 2212/7201* (2013.01); *G06F 2212/7208* (2013.01)

(58) Field of Classification Search
CPC . G06F 12/0238; G06F 12/10; G06F 2212/152

USPC ......................................................... 711/154
See application file for complete search history.

(56) References Cited

U.S. PATENT DOCUMENTS

| 8,171,153 B2 * | 5/2012 | Shukla ................ H04L 65/4015 |
| | | 709/231 |
| 2003/0105939 A1 * | 6/2003 | Cooksey ............. G06F 12/0862 |
| | | 711/203 |

FOREIGN PATENT DOCUMENTS

KR 1020150057069 5/2015

* cited by examiner

*Primary Examiner* — Jae Yu
(74) *Attorney, Agent, or Firm* — IP & T Group LLP

(57) ABSTRACT

A data storage device includes a plurality of memory apparatuses, a searching unit configured to search for "k" physical addresses mapped to "k" continuous logical addresses, and a processor configured to determine numerical consecutiveness of "i" logical addresses mapped to "i" continuous physical addresses consecutive to an $K^{th}$ physical address of the "k" physical addresses, and transmit a first pre-read command with respect to a first pre-read memory area corresponding to the "i" continuous physical addresses and first read-estimated physical addresses consecutive to the "i" continuous physical addresses when the numerical consecutiveness is admitted.

19 Claims, 8 Drawing Sheets

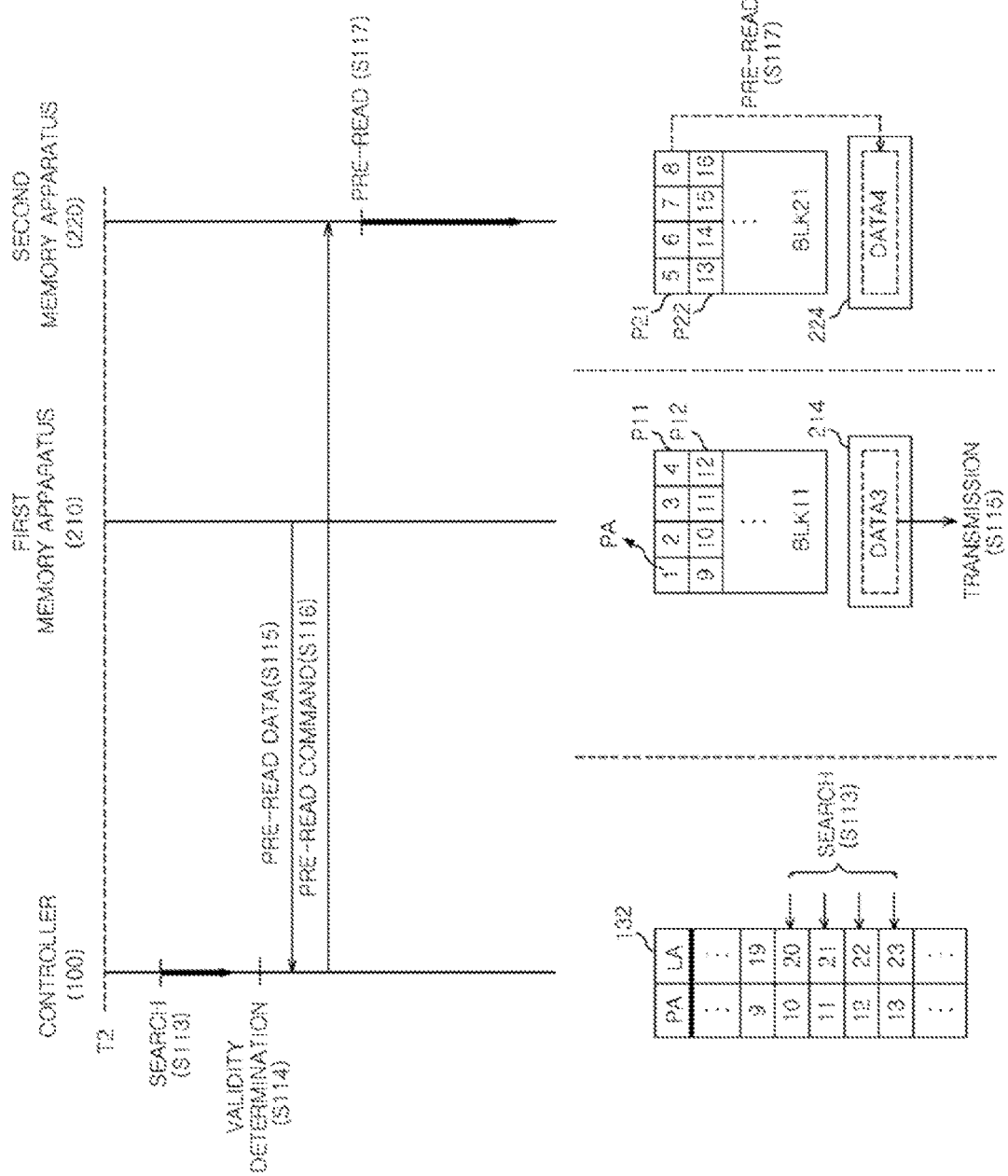

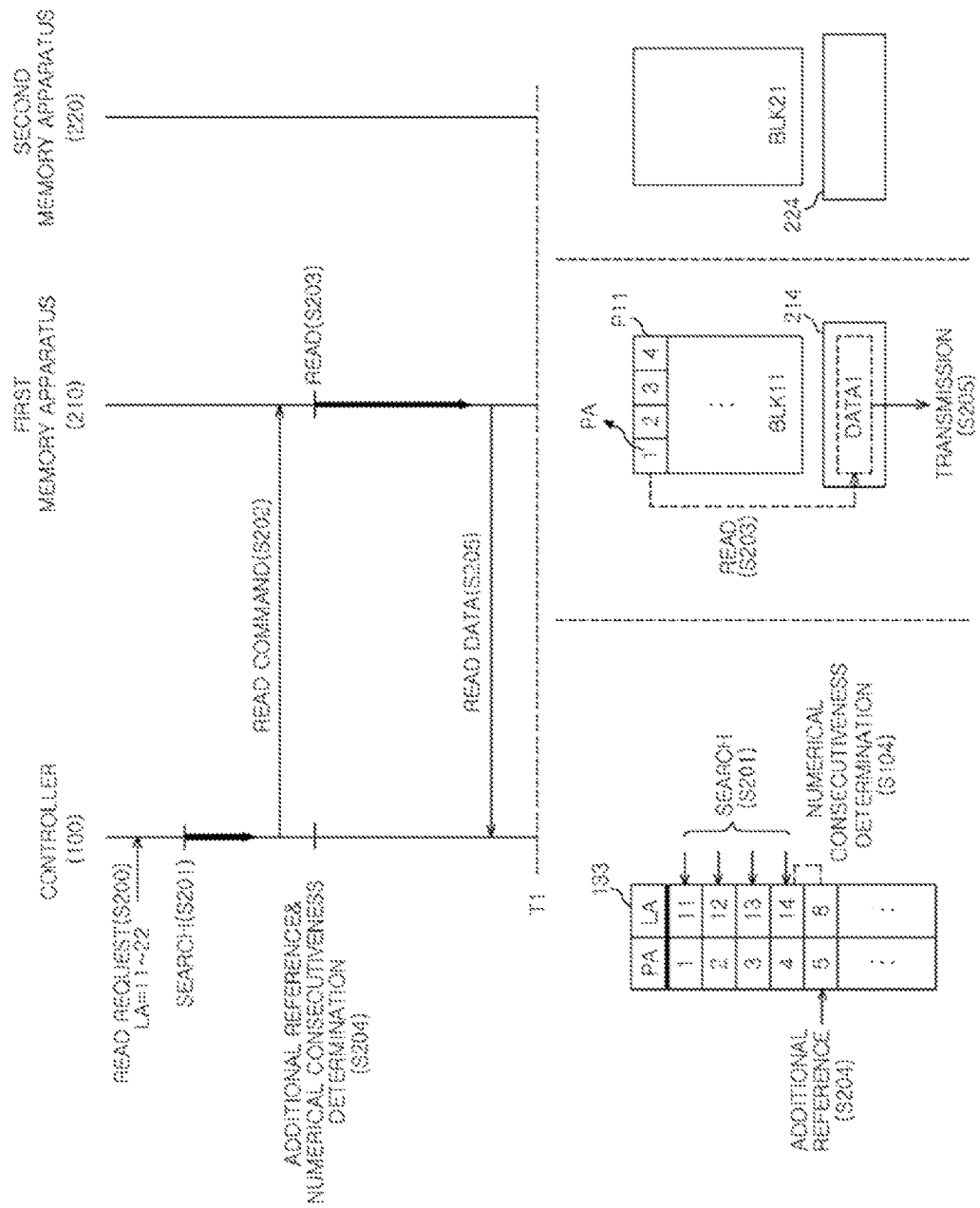

DATA STORAGE DEVICE AND OPERATING METHOD THEREOF

CROSS-REFERENCES TO RELATED APPLICATION

The present application claims priority under 35 U.S.C. §119(a) to Korean application number 10-2015-0027352, filed on Feb. 26, 2015, in the Korean Intellectual Property Office, which is incorporated herein by reference in its entirety as set forth in full.

BACKGROUND

1. Technical Field

Various embodiments relate to a data storage and, more particularly, to a data storage device and an operating method for processing a sequential read request.

2. Related Art

A data storage device stores data provided from an external device in response to a write request of the external device. Furthermore, the data storage device provides the external device with the stored data in response to a read request of the external device. The external device is an electronic device capable of processing data, and may include a computer, a digital camera, a cellular phone and the like. The data storage device may be embedded in the external device, and may be removable from the external device.

The data storage device may be prepared in the form of a Personal Computer Memory Card International Association (PCMCIA) card, a Compact Flash (CF) card, a smart media card, a memory stick, various multimedia cards (MMC, eMMC, RS-MMC, and MMC-Micro), an Secure Digital card (SD, Mini-SD, and Micro-SD), a Universal Flash Storage (UFS), an Solid State Drive (SSD) and the like.

The data storage device may include a nonvolatile memory apparatus in order to store data. The nonvolatile memory apparatus may retain stored data without power. The nonvolatile memory apparatus may include a flash memory apparatus such as a NAND flash or a NOR flash, a Ferroelectrics Random Access Memory (FeRAM), a Phase-Change Random Access Memory (PCRAM), a Magnetic Random Access Memory (MRAM), a Resistive Random Access Memory (ReRAM), and the like.

SUMMARY

A data storage device according to an embodiment of the present invention may include: a plurality of memory apparatuses; a searching unit suitable for searching for "k" number of physical addresses mapped to "k" number of numerically consecutive logical addresses in a mapping table; and a processor suitable for: determining whether "i" number of logical addresses are numerically consecutive to the "k" logical addresses, wherein the logical addresses are mapped to "i" number of physical addresses numerically consecutive to the "k" physical addresses, and transmitting a first pre-read command along with first pre-read physical addresses for access to a first pre-read memory area when the "i" logical addresses are numerically consecutive to the "k" logical addresses, wherein the first pre-read physical addresses include the "i" physical addresses and one or more first read-estimated physical addresses numerically consecutive to the "i" physical addresses.

An operating method of a data storage device according to an embodiment of the present invention may include: searching for "k" number of physical addresses mapped to "k" number of numerically consecutive logical addresses in a mapping table; determining whether "i" number of logical addresses are numerically consecutive to the "k" logical addresses, wherein the "i" logical addresses are mapped to "i" number of physical addresses numerically consecutive to the "k" physical addresses; and transmitting a first pre-read command along with first pre-read physical addresses for access to a first pre-read memory area when the "i" logical addresses are numerically consecutive to the "k" logical addresses, wherein the first pre read physical addresses include the "i" physical addresses and one or more first read-estimated physical addresses numerically consecutive to the "i" physical addresses.

A data storage device according to an embodiment of the present invention may include: a controller suitable for: searching for a first physical address mapped to a read-requested first logical address, determining whether a second logical address is numerically consecutive to the first logical address, wherein the second logical address is mapped to a second physical address numerically consecutive to the first physical address, and transmitting a first pre-read command along with the second physical address for access to a first pre-read memory area when the second logical address is numerically consecutive to the first logical address; and a first memory apparatus suitable for performing a read operation to the first pre-read memory area in response to the first pre-read command and the second physical address.

BRIEF DESCRIPTION OF THE DRAWINGS

Features, aspects, and embodiments are described in conjunction with the attached drawings, in which:

FIGS. 4A to 4C are transaction diagrams illustrating an operation method of a data storage device shown in FIGS. 1 to 3; and FIGS. 5A and 5B are transaction diagrams illustrating an operation method of a data storage device shown in FIGS. 1 to 3.

DETAILED DESCRIPTION

Figure 1:
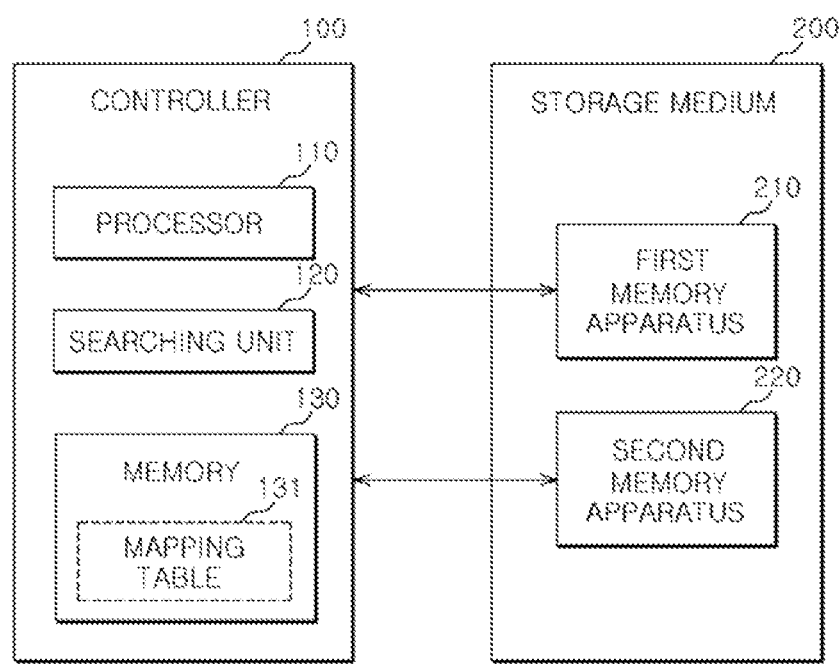
FIG. 1 is a block diagram illustrating a data storage device according to an embodiment of the present invention.

Hereinafter, a data storage device and an operating method thereof according to the present invention will be described with reference to the accompanying drawings through exemplary embodiments. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale and, in some instances, proportions may have been exaggerated in order to more clearly depict certain features of the invention. While particular terminology is used, it is to be appreciated that the terminology used is for describing particular embodiments only and is not intended to limit the scope of the present invention.

FIG. 1 is a block diagram illustrating a data storage device 10 according to an embodiment of the present invention.

The data storage device 10 may include a controller 100 and a storage medium 200.

The controller 100 may include a processor 110, a searching unit 120, and a memory 130.

The processor 110 may control a general operation of the data storage device 10. The processor 110 may control a write operation or a read operation of the storage medium 200 in response to a write request or a read request of an external device. The processor 110 may generate commands for controlling the operations of the storage medium 200, and transmit the generated commands to the storage medium 200. The processor 110 may execute software on the memory 130 for controlling the operations of the data storage device 10.

The processor 110 may perform a mapping operation and write and read operations based on logical addresses included in the write request or the read request of the external device. In detail, in response to the write request, the processor 110 may map the logical address to a physical address for the storage medium 200, and control write-requested data to be written in a memory area corresponding to the mapped physical address. When the read request is received, the processor 110 may search for a physical address mapped to the logical address, and control read-requested data to be read from a memory area corresponding to the searched physical address.

The processor 110 may manage mapping information between the logical address and the physical address as a mapping table 131. The processor 110, for example, may manage a logical to physical (L2P) mapping table and a physical to logical (P2L) mapping table. The L2P mapping table may include physical addresses respectively mapped to logical addresses, which are set as indexes thereof. The P2L mapping table may include logical addresses respectively mapped to physical addresses, which are set as indexes thereof. The processor 110 may manage the mapping information in the P2L mapping table for an open memory block, which is available for a write request. The processor 110 may generate the L2P mapping table based on the P2L mapping table for a closed memory block, which does not have available memory space for data. Therefore, in response to the read request for data stored in the open memory block, the processor 110 may control the searching unit 120 to quickly obtain required mapping information only in the P2L mapping table.

The searching unit 120 may search a physical address mapped to a read-requested logical address in the P2L mapping table under the control of the processor 110. The searching unit 120 may search for "k" number of the addresses at a time. For example, response to a sequential read request including numerically continuous logical addresses, the searching unit 120 may perform a plurality search operations, each of which is performed by the "k" number of the addresses, for physical addresses mapped to all read-requested logical addresses.

In response to the sequential read request for numerically continuous "n" number of the logical addresses, the processor 110 may control the searching unit 120 to repeatedly search for "k" physical addresses mapped to the "k" numerically continuous logical addresses in order to find all of "n" physical addresses mapped to the numerically continuous "n" logical address. The processor 110 may transmit a read command for a memory area corresponding to the searched "k" physical addresses.

During the search operation, based on each search result of the searching unit 120, the processor 110 may additionally refer to the P2L mapping table and transmit a pre-read command.

In detail, after each search for the "k" physical addresses mapped to the "k" numerically continuous logical addresses, the processor 110 may additionally refer to mapping information of "i" number of numerically continuous physical addresses numerically consecutive to a $K^{th}$ or the last physical address of the searched "k" physical addresses, thereby determining numerical consecutiveness of "i" logical addresses, which are mapped to the "i" numerically continuous physical addresses, to the "k" numerically continuous logical addresses of the read request. When the "i" logical addresses are numerically consecutive to the "k" numerically continuous logical addresses, the processor 110 may transmit the pre-read command. The $k^{th}$ physical address may be mapped to a $k^{th}$ logical address of the "k" numerically continuous logical addresses. Since the P2L mapping table has physical addresses with indexes, the processor 110 may additionally refer to the "i" continuous physical addresses numerically consecutive to the $k^{th}$ physical address in the P2L mapping table.

When the "i" logical addresses are consecutive to the $k^{th}$ logical address, the processor 110 may transmit a pre-read command along with pre-read physical addresses for access to a pre-read memory area in the storage medium 200. The pre-read physical addresses may include the "i" physical addresses and one or more read-estimated physical addresses numerically consecutive to the "i" physical addresses. Size of the pre-read memory area may be an access unit of the storage medium 200, for example, a single page. The processor 110 may generate the pre-read command in a format substantially the same as that of a read command.

In this case, the $k^{th}$ physical address searched by the searching unit 120 may correspond to a different memory apparatus from the memory apparatus corresponding to the "i" continuous physical addresses that is additionally referred to by the processor 110. Accordingly, the processor 110 may transmit the read command and following pre-read commands in order to alternately access each of the first and second memory apparatuses 210 and 220. Accordingly, the first and second memory apparatuses 210 and 220 may perform read operations in a parallel manner, thereby improving sequential read speed of the data storage device 10.

When the "i" logical addresses are consecutive to the $k^{th}$ logical address, the processor 110 may control the searching unit 120 to subsequently search for "k" physical addresses mapped to the "k" continuous logical addresses consecutive to the "i" logical addresses.

Based on the subsequent search result, the processor 110 may determine the validity of data pre-read from the pre-read memory area. In detail, the processor 110 may determine whether first "k-i" number of physical addresses among the subsequently searched "k" physical addresses coincide with the previous read-estimated physical addresses. When the preceding "k-i" number of physical addresses among the subsequently searched "k" physical addresses coincide with the previous read-estimated physical addresses, the processor 110 may transmit the pre-read data to the external device.

Furthermore, the processor 110 may transmit a subsequent pre-read command along with subsequent pre-read physical addresses for access to another pre-read memory area in the storage medium 200. The subsequent pre-read physical addresses may include the remaining "i" physical addresses among the subsequently searched "k" physical addresses and another read-estimated physical addresses numerically consecutive to the subsequent "i" physical addresses. In brief, after transmitting the initial pre-read command once, the processor 110 may continuously transmit a subsequent pre-read command based on the subsequently searched physical addresses without performing the additional reference of the P2L mapping table and the numerical consecutiveness determination.

Following is an example in which "k" is 4 and "i" is 1. In the example, the searching unit 120 may search for four physical addresses mapped to four logical addresses at a time and the processor 110 determines the numerical consecutiveness of a single logical address mapped to a single physical address numerically consecutive to the fourth physical address.

The memory 130 may function as a working memory, a buffer memory, or a cache memory of the processor 110. The memory 130 may serve as a working memory that stores various program data and software driven by the processor 110. The memory 130 may serve as a buffer memory that buffers data transmitted between the external device and the storage medium 200. The memory 130 may serve as a cache memory that temporarily stores cache data.

The storage medium 200 may include a first memory apparatus 210 and a second memory apparatus 220. The first and second memory apparatuses 210 and 220 may be nonvolatile memory apparatuses. Each of the first and second memory apparatuses 210 and 220 may store data and read the stored data under the control of the processor 110. FIG. 1 exemplarily illustrates the storage medium 200 including two memory apparatuses, the number of which may vary according to design.

Figure 2:
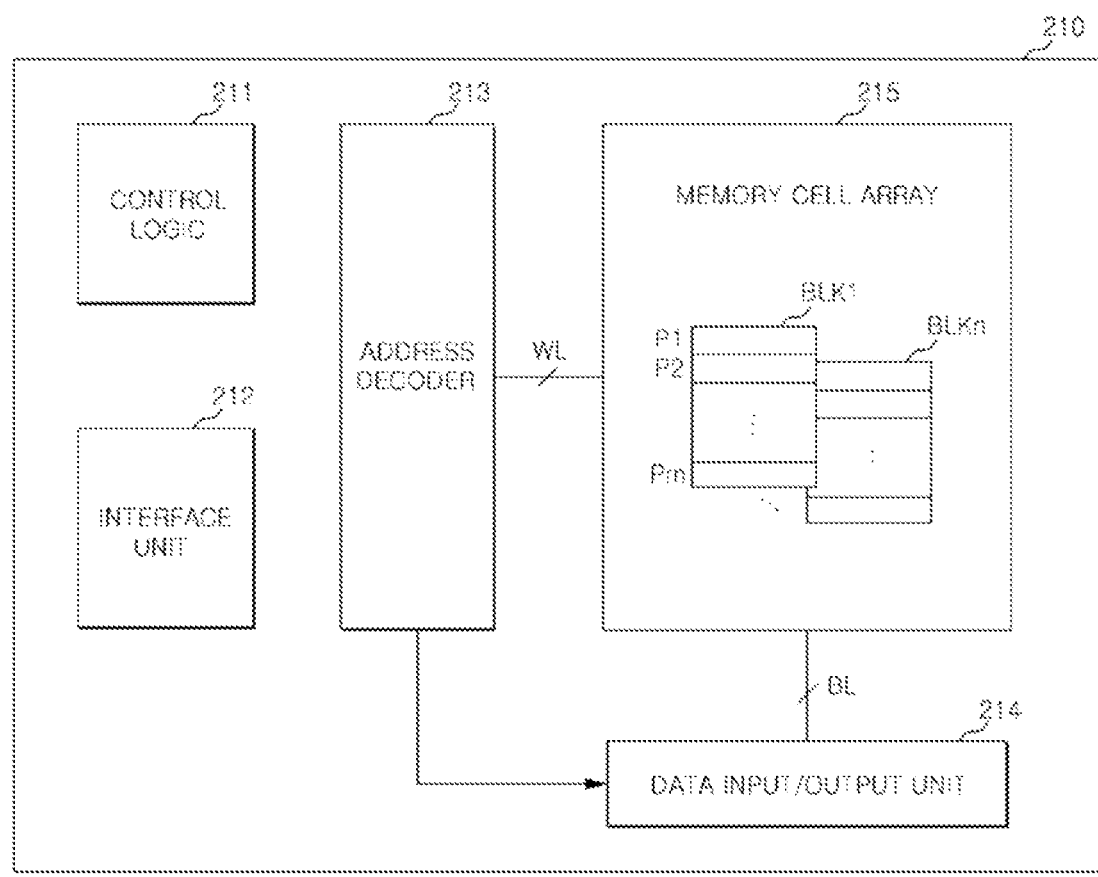
FIG. 2 is a block diagram illustrating a first memory apparatus of FIG. 1.

FIG. 2 is a block diagram illustrating the first memory apparatus 210 of FIG. 1. The first and second memory apparatuses 210 and 220 may be substantially the same as each other.

The first memory apparatus 210 may include a control logic 211, an interface unit 212, an address decoder 213, a data input/output unit 214, and a memory cell array 215.

The control logic 211 may control general operations such as a write operation, a read operation, and an erase operation of the first memory apparatus 210 in response to a command provided from the controller 100.

The interface unit 212 may exchange various control signals including a command and an address and data with the controller 100. The interface unit 212 may transmit the inputted various control signals and data to the internal elements of the first memory apparatus 210.

The address decoder 213 may decode transmitted row addresses and column addresses. The address decoder 213 may control word lines WL to be selectively driven according to a decoding result of the row addresses. The address decoder 213 may control the data input/output unit 214 such that bit lines BL are selectively driven according to a decoding result of the column addresses.

The data input/output unit 214 may transmit data transmitted from the interface unit 212 to the memory cell array 215 through the bit lines BL. The data input/output unit 214 may transmit data read from the memory cell array 215 through the bit lines BL to the interface unit 212. The data input/output unit 214 may temporarily store data transmitted between the interface unit 212 and the memory cell array 215.

The memory cell array 215 may be coupled to the address decoder 213 through the word lines WL and may be coupled to the data input/output unit 214 through the bit lines BL. The memory cell array 215, for example, may have a three-dimensional structure. The memory cell array 215 may include a plurality of memory cells arranged in areas where the word lines WL cross the bit lines BL. The memory cells may be distinguished from one another according to a bit number of stored data per memory cell. For example, the memory cells may be classified into a single level cell for storing 1 bit per memory cell and a multi-level cell for storing at least two bits per memory cell.

The memory cell array 215 may include a plurality of memory blocks BLK1 to BLKn. Each of the plurality of memory blocks BLK1 to BLKn may include a plurality of pages, for example, P1 to Pm. The memory block may be a unit by which the erase operation of the first memory apparatus 210 is performed. The page may be a unit by which the write operation or the read operation of the first memory apparatus 210 is performed.

Figure 3:
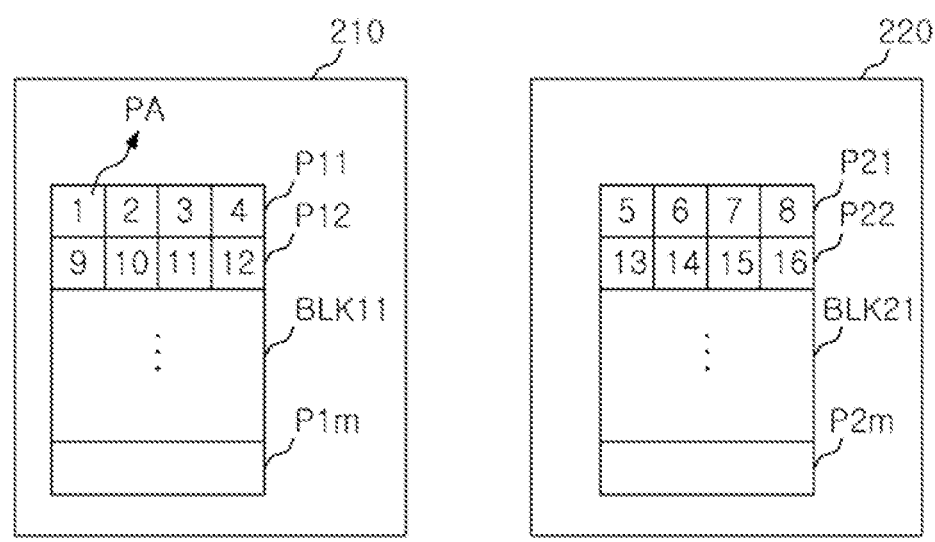
FIG. 3 is a schematic diagram illustrating physical addresses of first and second memory apparatuses shown in FIGS. 1 and 2.

FIG. 3 is a schematic diagram illustrating physical addresses PAs of the first and second memory apparatuses 210 and 220 described with reference to FIGS. 1 and 2. FIG. 3 illustrates representative memory blocks BLK11 and BLK21 of the first and second memory apparatuses 210 and 220.

The memory areas of the first and second memory apparatuses 210 and 220 may receive physical addresses PAs. For example, a single physical address PA may correspond to a memory area of 4 Kbytes. When each of the physical addresses PAs corresponds to the memory area of 4 Kbytes and the size of a single page is 16 Kbytes, four physical addresses PAs may correspond to the single page. In this case, the four numerically consecutive physical addresses PAs may be assigned in one of the plurality of pages P11 to P1m and P21 to P2m. FIG. 3 exemplarily illustrates four numerically consecutive physical addresses PAs 1 to 4 assigned to the single page P11, 5 to 8 assigned to the single page P21, 9 to 12 assigned to the single page P12, and 13 to 16 assigned to the single page P22.

The physical addresses PAs may be assigned in a write order for the plurality of pages P11 to P1m and P21 to P2m. Accordingly, when each four physical addresses PAs are assigned by the units of pages alternately between the first and second memory apparatuses 210 and 220, the processor 110 may control the write operations of the first and second memory apparatuses 210 and 220 in a parallel manner according to an interleaving scheme. For example, referring to FIG. 3, the write operation may be performed in alternate sequence of the pages P11, P21, P12, P22 according to the interleaving scheme. In such a case, when a write command for the page P11 and a write command for the page P21 are sequentially transmitted to the first and second memory apparatuses 210 and 220, the first and second memory apparatuses 210 and 220 perform the write operations in a parallel manner, thereby contributing to the improvement in operation speed.

Figure 4A:
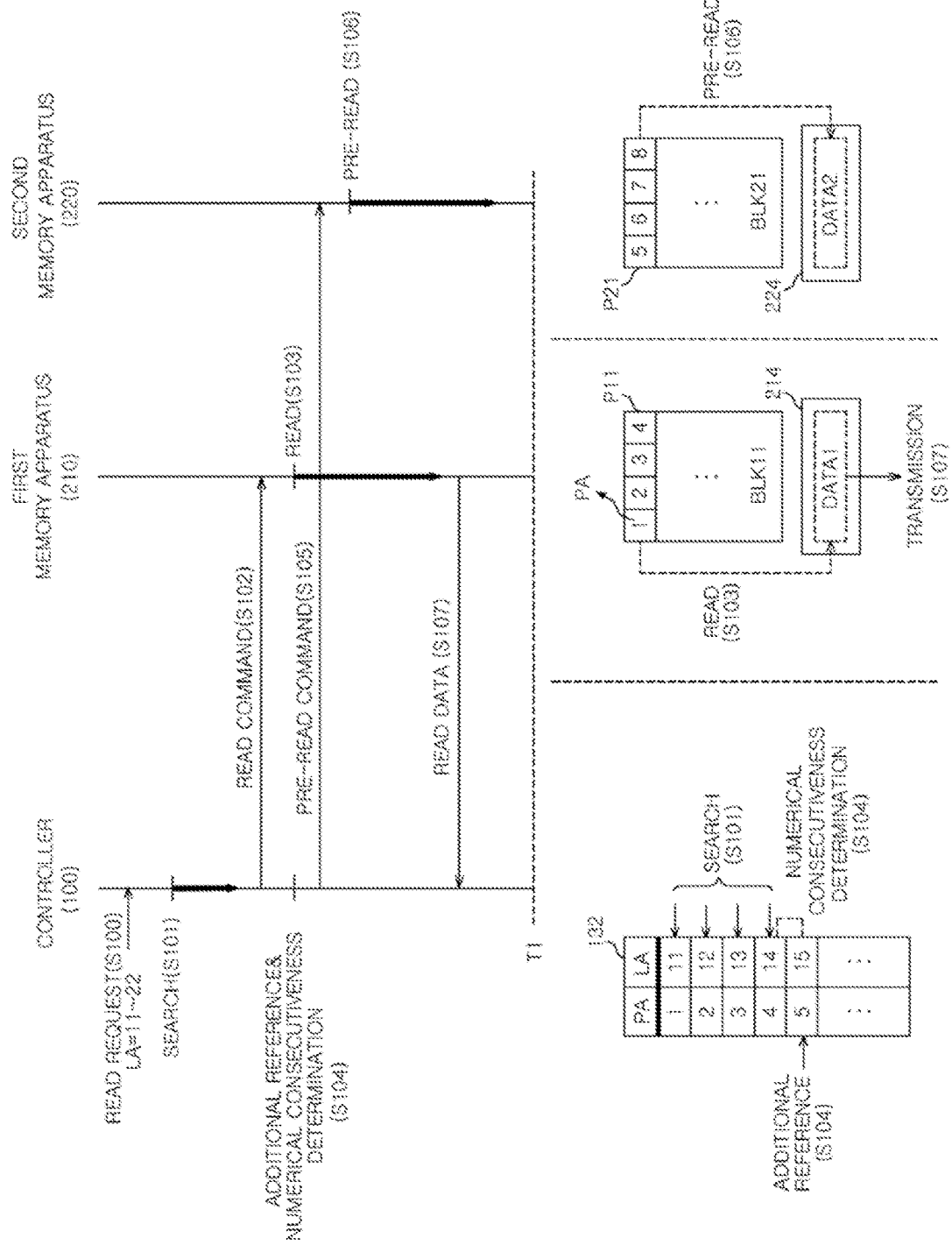
Figure 4B:
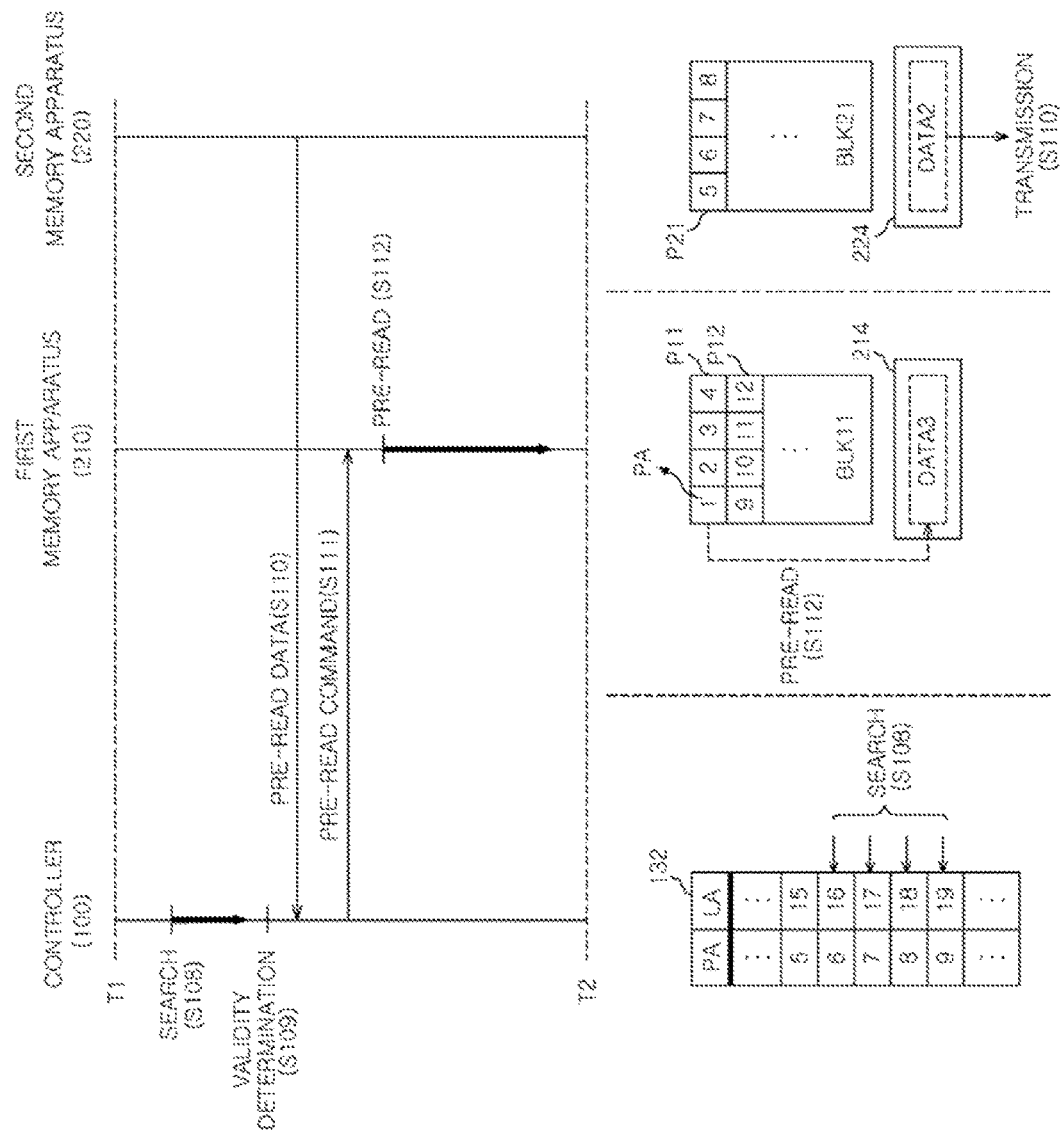

FIGS. 4A to 4C are transaction diagrams illustrating an operation method of the data storage device 10 described with reference to FIGS. 1 to 3.

FIG. 4A illustrates a procedure of the data storage device 10 in which the controller 100 transmits the initial pre-read command in response to the sequential read request. Furthermore, FIG. 4A illustrates the P2L mapping table 132 managed in the mapping table 131 described with reference to FIG. 1, the memory block BLK11 of the first memory apparatus 210, the data input/output unit 214, the memory block BLK21 of the second memory apparatus 220, and a data input/output unit 224.

At step S100, the processor 110 may receive the sequential read request for numerically continuous logical addresses LAs, for example from 11 to 22, from the external device.

At step S101, the searching unit 120 may search for four physical addresses mapped to first four continuous logical addresses LAs (11 to 14) of the read-requested continuous logical addresses LAs (11 to 22). The searching unit 120 may search for and output numerically consecutive physical addresses PAs, for example, from 1 to 4, mapped to the first four logical addresses LAs 11 to 14 in the P2L mapping table 132.

At step S102, the processor 110 may transmit a read command with respect to a page P11 corresponding to the searched physical addresses PAs 1 to 4.

At step S103, the first memory apparatus 210 performs a read operation for the page P11 in response to the read command. When the read operation is performed, data DATA1 may be transmitted from the page P11 to the data input/output unit 214.

At step S104, the processor 110 may additionally refer to mapping information of a single physical address PA of the address number 5, which is numerically consecutive to the searched physical addresses PAs 1 to 4 from the P2L mapping table 132. Then, the processor 110 may determine the numerical consecutiveness of the logical address LA of the address number 15, which is mapped to the additionally referred physical address PA of the address number 5. For example, the processor 110 may determine that the logical address LA of the address number 15 is numerically consecutive to the first four logical addresses LAs 11 to 14.

At step S105, the processor 110 may transmit an initial pre-read command along with the pre-read physical addresses for access to the pre-read memory area corresponding to the pre-read physical addresses. The pre-read physical addresses may include the physical address PA of the address number 5 and read-estimated physical addresses PAs of the address numbers 6 to 8, which are numerically consecutive to the physical address PA of the address number 5. The size of the pre-read memory area for the pre-read command and the pre-read physical addresses may be an access unit of the storage medium 200, which is the same as the normal memory area for the normal read command and the normal physical addresses PAs, for example, a single page. As described with reference to the interleaving scheme, FIG. 4A illustrates alternate access to the page P21 of the second memory apparatus 220. The processor 110 may generate the pre-read command in substantially the same format as that of the read command.

At step S106, the second memory apparatus 220 may perform a pre-read operation for the page P21 in response to the initial pre-read command along with the pre-read physical addresses of the address numbers 5 to 8. The second memory apparatus 220 may perform the pre-read operation in substantially the same way as the normal read operation for the normal read command. The pre-read operation of the second memory apparatus 220 and the read operation of the first memory apparatus 210 may be performed in a parallel manner. When the pre-read operation is performed, data DATA2 may be transmitted from the page P21 to the data input/output unit 224 and may be temporarily stored in the data input/output unit 224.

At step S107, the first memory apparatus 210 may transmit read data DATA1 to the controller 100.

In the present invention, the term "pre-read" may represent read of data with high probability that the data may be read by a following normal read command.

For example, it is highly probable that the physical address PA of the address number 5 mapped to the logical address LA of the address number 15 numerically consecutive to the previous logical addresses LAs 11 to 14 will be sequentially read according to numerically consecutive access characteristics of sequential data. Accordingly, when data corresponding to the physical address PA of the address number 5 mapped to the logical address LA of the address number 15, which is numerically consecutive to the previous logical addresses LAs 11 to 14, is to be read by a normal read command right after the previous normal read command along with the logical addresses LAs 11 to 14, the pre-read data by the pre-read command along with the pre-read physical addresses of the address numbers 5 to 8 may be immediately provided, which may improve the overall read speed of the data storage device 10.

In this way, in accordance with an exemplary embodiment of the present invention, during the sequential read operation, data of the pre-read memory area is pre-read according to the pre-read command along with the pre-read physical addresses beside the normal read operation by the normal read command. The pre-read physical addresses may include the "i" number of the physical addresses and one or more read-estimated physical addresses numerically consecutive to the "i" physical addresses. The pre-read physical address may correspond to the pre-read memory area. For example, pre-read physical addresses may include the physical address PA of the address number 5 and read-estimated physical addresses PAs of the address numbers 6 to 8, which are numerically consecutive to the physical address PA of the address number 5. The physical address PA of the address number 5 is numerically consecutive to the searched physical addresses PAs 1 to 4, which are mapped to the previous logical addresses LAs 11 to 14 of the previous normal read command. When the logical address LA of the address number 15 mapped to the physical address PA of the address number 5 is determined to be numerically consecutive to the previous logical addresses LAs 11 to 14, the pre-read data may be immediately provided, which will be described with reference to FIGS. 4B and 4C.

FIG. 4B and FIG. 4C illustrate a procedure of the data storage device 10 after the procedure described with reference to FIG. 4A. FIGS. 4B and 4C illustrate that the controller 100 determines the validity of the pre-read data based on subsequent search after the transmission of the previous pre-read command, and then transmits the next pre-read command.

Referring to FIG. 4B, at step S108, the searching unit 120 may search for four physical addresses mapped to the four continuous logical addresses LAs of the address numbers 16 to 19, which are numerically consecutive to the additionally referred logical address LA of the address number 15. Since mapping information on the logical address LA 15 has been indirectly obtained by the additional reference of the processor 110 at step S104 as described with reference to FIG. 4A, a search for the logical address LA 15 may not be necessary. The searching unit 120 may search and output the physical addresses PAs of the address numbers 6 to 9 mapped to the logical addresses LAs 16 to 19 from the P2L mapping table 132.

At step S109, the processor 110 may determine the validity of the pre-read data DATA2 based on the searched physical addresses PAs 6 to 8. In detail, the processor 110 may determine whether the searched physical addresses PAs 6 to 8 coincide with the pre-read read-estimated physical addresses PAs 6 to 8 included in the pre-read physical addresses of steps S105 and S106 described with reference to FIG. 4A. That is, through the present step, the processor 110 may determine whether the pre-read data DATA2 is to be provided in response to the sequential read request of step S100.

At step S110, when the processor 110 determines that the searched physical addresses PAs 6 to 8 coincide with the pre-read read-estimated physical addresses PAs 6 to 8 included in the pre-read physical addresses, the second memory apparatus 220 may transmit the pre-read data DATA2 to the controller 100. The controller 100 may control the second memory apparatus 220 to transmit the pre-read data DATA2.

At step S111, the processor 110 may transmit another pre-read command along with another pre-read physical addresses for access to another pre-read memory area. The pre-read physical addresses may include the searched physical address PA of the address number 9 which is the last one of the searched physical addresses PAs 6 to 9, and read-estimated physical addresses PAs of the address numbers 10 to 12, which are numerically consecutive to the searched physical addresses PAs 6 to 9. As described with reference to the interleaving scheme, FIG. 4B illustrates alternate access to the page P12 of the first memory apparatus 210 as another pre-read memory area.

At step S112, the first memory apparatus 210 performs the pre-read operation for the pre-read memory area P12 in response to the pre-read command along with the pre-read physical addresses PAs 9 to 12. The first memory apparatus 210 may perform the pre-read operation in substantially the same method as the read operation by the read command. When the pre-read operation is performed, data DATA3 may be transmitted from the pre-read memory area P12 to the data input/output unit 214 and may be temporarily stored in the data input/output unit 214.

In brief, in the procedure illustrated in FIG. 4A, the processor 110 transmits the pre-read command by the additional reference and the numerical consecutiveness determination at step S104. However, in the procedure illustrated in FIG. 4B, the pre-read command may be continuously transmitted based on only the additional search of the searching unit 120 at step S111 while the previously pre-read data DATA2 is transmitted at step S110 based on the validity determination of step S109. Even though only the normal read command for a single memory apparatus has been transmitted at step S102 based on the initial search of step S101, the searching unit 120 may additionally search for the physical addresses PA 6 to 9 at step S108 over the first and second memory apparatuses 210 and 220 due to the additional reference of the processor 110 at step S104. Even after the transmission of the initial pre-read command, the processor 110 continuously transmits the next pre-read command, thereby improving the read speed of the data storage device 10.

The procedure illustrated in FIG. 4C may be performed subsequently to the procedure illustrated in FIG. 4B in a similar way to the procedure illustrated in FIG. 4B.

At step S113, the searching unit 120 may finally search for four physical addresses mapped to four continuous logical addresses LAs of the address numbers 20 to 23, which are numerically consecutive to the previous logical addresses LA 16 to 19. The searching unit 120 may search and output the physical addresses PAs of the address numbers 10 to 13 mapped to the logical addresses LAs 20 to 23 from the P2L mapping table 132. Even though the logical address LA of the address number 23 has not been currently requested by the sequential read request of step S100, it is highly probable that the read of the logical address LA 23 will be requested soon due to the characteristics of the sequential read request and thus the logical address LA 23 may be searched.

At step S114, the processor 110 may determine the validity of the pre-read data DATA3 based on the searched physical addresses PAs 10 to 12 included in the pre-read physical addresses of step S111 described with reference to FIG. 4B. That is, through the present step, the processor 110 may determine whether the pre-read data DATA3 is to be provided in response to the sequential read request of step S100.

At step S115, when the processor 110 determines that the searched physical addresses PAs 10 to 12 coincide with the pre-read read-estimated physical addresses PAs 10 to 12 included in the pre-read physical addresses, the first memory apparatus 210 may transmit the pre-read data DATA3 to the controller 100. The controller 100 may control the first memory apparatus 210 to transmit the pre-read data DATA3.

At step S116, the processor 110 may transmit another pre-read command along with another pre-read physical addresses for access to another pre-read memory area. The pre-read physical addresses may include the searched physical address PA of the address number 13, which is the last one of the searched physical addresses PAs 10 to 13, and read-estimated physical addresses PAs of the address numbers 14 to 16, which are numerically consecutive to the searched physical addresses PAs 10 to 13. As described with reference to the interleaving scheme, FIG. 4B illustrates alternate access to the page P22 of the second memory apparatus 220 as another pre-read memory area.

At step S117, the second memory apparatus 220 performs the pre-read operation for the pre-read memory area P22 in response to the pre-read command along with the pre-read physical addresses PAs 13 to 16. The second memory apparatus 220 may perform the pre-read operation with substantially the same method as the read operation by the read command. When the pre-read operation is performed, data DATA4 may be transmitted from the pre-read memory area P22 to the data input/output unit 224 and may be temporarily stored in the data input/output unit 224.

In brief, the searching unit 120 may repeatedly search for physical addresses for all the logical addresses of the sequential read request. The processor 110 may determine the validity of previously pre-read data before the current search based on the current search result of the searching unit 120, and may currently load the previously pre-read data to the controller 100 when the previously pre-read data is valid. Furthermore, based on the current search result of the searching unit 120, the processor 110 may transmit another pre-read command, thereby improving operation speed.

When the previously pre-read data is determined not valid based on the search result of the searching unit 120, the processor 110 may ignore the previously pre-read data and newly transmit a normal read command based on searched physical addresses.

FIG. 4A to FIG. 4C illustrate that the searching unit 120 performs a subsequent search, for example, the current search of step S113, after completing the pre-read operation, for example, the previous pre-read operation of step S112. However, according to embodiments, the subsequent search of the searching unit 120 may be performed while the pre-read operation is being performed. When the search of the searching unit 120 and the pre-read operation are performed in a parallel manner, a search time may be reduced and a read operation speed may be further improved.

Figure 5B:
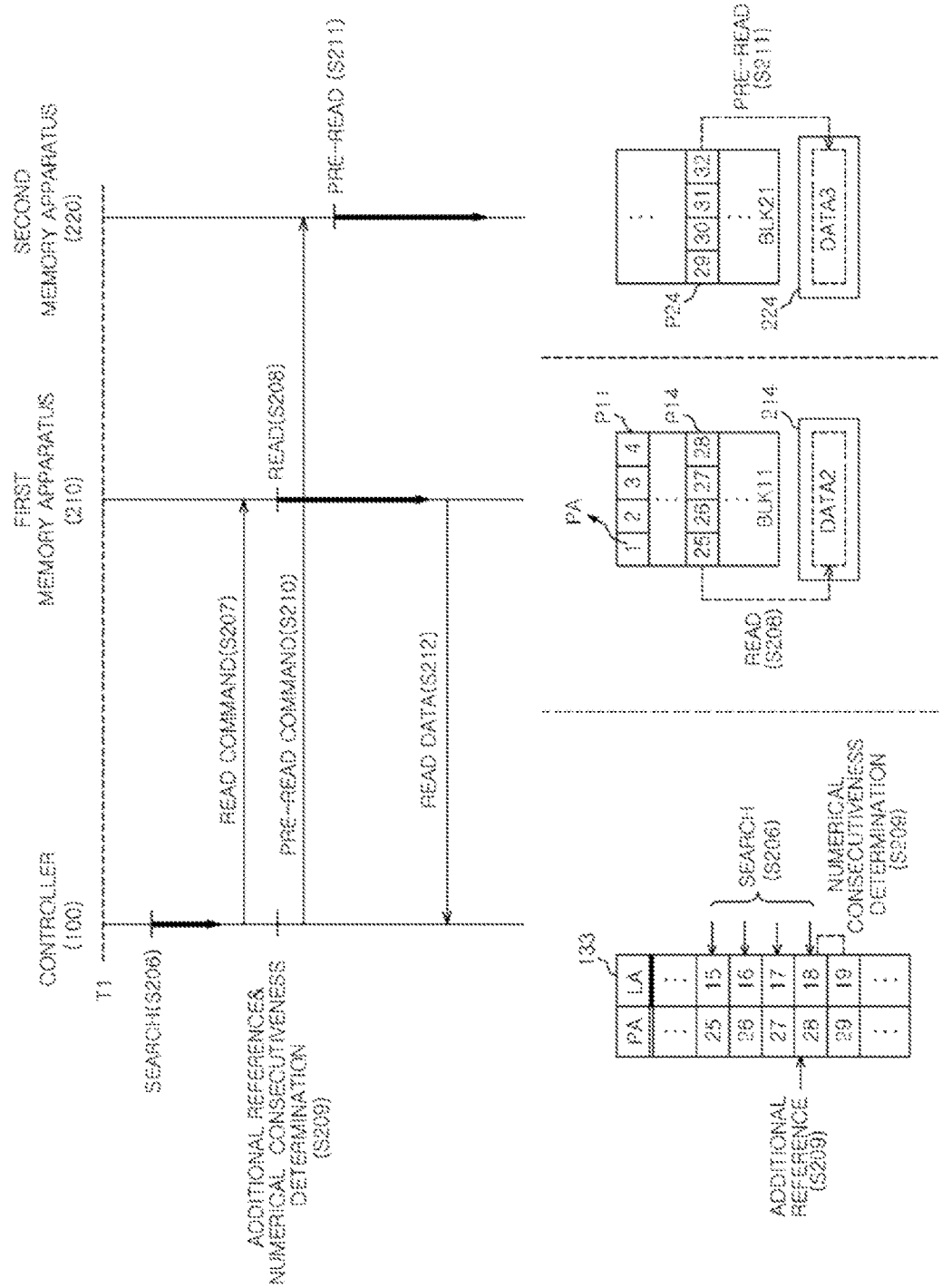

FIGS. 5A and 5B are transaction diagrams illustrating, an operation method of the data storage device 10 described with reference to FIGS. 1 to 3.

FIG. 5A and FIG. 5B illustrate a procedure of the data storage device 10 in which the controller 100 transmits the initial pre-read command through additional reference and numerical consecutiveness determination in response to the sequential read request, similarly to FIG. 4A. Different from the positive result of the numerical consecutiveness determination as described with reference to FIG. 4A, FIG. 5A exemplarily illustrates the operation of the data storage device 10 when the result of the numerical consecutiveness determination is negative.

Referring to FIG. 5A, the operation of the controller 100 of steps S200 to step S204 is substantially the same as steps S100 to step S104 described with reference to FIG. 4A. However, at step S204, the logical address LA of the address number 8, which is mapped to the additionally referred physical address of the address number 5 from the searched physical addresses PAs 1 to 4 at steps S200 and S201, may be determined not to be numerically consecutive to the logical addresses LAs of the address numbers 11 to 14, which are mapped to the searched physical addresses PAs 1 to 4, as the result of the numerical consecutiveness determination. Data corresponding to the physical address PA of the address number 5, which is additionally referred physical address and mapped to the logical address LA 8, is not sequential-read requested data, and thus does not need to be pre-read, the processor 110 may not transmit the pre-read command.

At step S205, the first memory apparatus 210 may transmit read data DATA1 to the controller 100 in response to the normal read command of step S202.

Referring to FIG. 5B, the operation of the controller 100 and the first and second memory apparatuses 210 and 220 at steps S206 to S212 is substantially to the same as steps S101 to S107 described with reference to FIG. 4A. That is, at step S209, the processor 110 may perform the additional reference and numerical consecutiveness determination again based on the next search for the logical addresses LAs of the address numbers 15 to 18 of step S206, and may transmit the initial pre-read command along with the pre-read physical addresses at step S210 when the result of the numerical consecutiveness determination is positive.

For example as illustrated in FIG. 5B, at step S206, the searching unit 120 may search for four physical addresses mapped to the four continuous logical addresses LAs of the address numbers 15 to 18. The searching unit 120 may search and output the physical addresses PAs of the address numbers 25 to 28 mapped to the logical addresses LAs 15 to 18. At step S207, the normal read command may be transmitted to the first memory apparatus 210 along with the searched physical addresses PAs 25 to 28. At step S208, the first memory apparatus 210 may perform the normal read operation for the page P14 in response to the normal read command along with the searched physical addresses PAs 25 to 28. When the read operation is performed, data DATA2 may be transmitted from the page P14 to the data input/output unit 214. At step S209, the processor 110 may additionally refer to mapping information of a single physical address PA of the address number 29, which is numerically consecutive to the searched physical addresses PAs 25 to 28. Then, the processor 110 may determine the numerical consecutiveness of the logical address LA of the address number 19, which is mapped to the additionally referred physical address PA of the address number 29. For example, the processor 110 may determine that the logical address LA of the address number 19 is numerically consecutive to the previous four logical addresses LAs 15 to 18. At step S210, the processor 110 may transmit an initial pre-read command along with the pre-read physical addresses for access to the pre-read memory area corresponding to the pre-read physical addresses. The pre-read physical addresses may include the physical address PA of the address number 29 and read-estimated physical addresses PAs of the address numbers 30 to 32, which are numerically consecutive to the physical address PA of the address number 29. As described with reference to the interleaving scheme, FIG. 5B illustrates alternate access to the page P24 of the second memory apparatus 220. At step S211, the second memory apparatus 220 may perform the pre-read operation for the page P24 in response to the initial pre-read command along with the pre-read physical addresses of the address numbers 29 to 32. When the pre-read operation is performed, data DATA3 may be transmitted from the page P24 to the data input/output unit 224 and may be temporarily stored in the data input/output unit 224.

Although not illustrated, after the procedure illustrated in FIG. 5B, the processor 110 may determine the validity of the pre-read data DATA3 based on subsequent search after the transmission of the previous pre-read command, and then transmit the next pre-read command, similarly to the operation described with reference to FIG. 4B.

While certain embodiments have been described above, it will be understood to those skilled in the art that the embodiments described are examples only. Accordingly, the data storage device and the operating method thereof described herein should not be limited based on the described embodiments. Rather, the data storage device and the operating method thereof described herein should only be limited in light of the claims that follow when taken in conjunction with the above description and accompanying drawings.

What is claimed is:

1. A data storage device comprising:
a plurality of memory apparatuses;
a searching unit suitable for searching for "k" number of physical addresses mapped to "k" number of numerically consecutive logical addresses in a mapping table; and
a processor suitable for:
determining whether "i" number of logical addresses are numerically consecutive to the "k" logical addresses, wherein the "i" logical addresses are mapped to "i" number of physical addresses that are numerically consecutive to the "k" physical addresses, and
transmitting a first pre-read command along with first pre-read physical addresses for access to a first pre-read memory area when the "i" logical addresses are numerically consecutive to the "k" logical addresses, wherein the first pre-read physical addresses include the "i" physical addresses and one or more first read-estimated physical addresses that are numerically consecutive to the "i" physical addresses.

2. The data storage device according to claim 1, wherein the processor further transmits a normal read command along with the "k" physical addresses for access to a normal memory area.

3. The data storage device according to claim 2, wherein the first pre-read memory area and the normal memory area are included in different memory apparatuses.

4. The data storage device according to claim 1, wherein, when the "i" number of logical addresses are numerically consecutive to the "k" logical addresses, the searching unit subsequently searches for another "k" number of physical addresses mapped to another "k" number of consecutive logical addresses that are numerically consecutive to the "i" logical addresses.

5. The data storage device according to claim 4, wherein the processor determines validity of data pre-read from the pre-read area based on a subsequent search result.

6. The data storage device according to claim 5, wherein the processor performs the validity determination by determining whether a first "k-i" number of physical addresses among the subsequently searched "k" physical addresses coincide with the first read-estimated physical addresses.

7. The data storage device according to claim 4, wherein the processor further transmits a second pre-read command along with second pre-read physical addresses for access to a second pre-read memory area, wherein the second pre-read physical addresses include "i" number of physical addresses subsequent to a first "k-i" number of physical addresses, among the subsequently searched "k" physical addresses, and one or more second read-estimated physical addresses that are numerically consecutive to the "i" physical addresses, subsequent to the first "k-i" number of physical addresses.

8. The data storage device according to claim 1, wherein the processor further refers to the mapping table in order to determine the numerical consecutiveness.

9. An operation method of a data storage device, comprising:
    searching for "k" number of physical addresses mapped to "k" number of numerically consecutive logical addresses in a mapping table;
    determining whether "i" number of logical addresses are numerically consecutive to the "k" logical addresses, wherein the "i" logical addresses are mapped to "i" number of physical addresses that are numerically consecutive to the "k" physical addresses; and
    transmitting a first pre-read command along with first pre-read physical addresses for access to a first pre-read memory area when the "i" logical addresses are numerically consecutive to the "k" logical addresses, wherein the first pre-read physical addresses include the "i" physical addresses and one or more first read-estimated physical addresses that are numerically consecutive to the "i" physical addresses.

10. The operation method according to claim 9, further comprising:
    transmitting a normal read command along with the "k" physical addresses for access to a normal memory area.

11. The operation method according to claim 10, wherein the first pre-read memory area and the normal memory area are located in different memory apparatuses.

12. The operation method according to claim 9, further comprising subsequently searching for another "k" number of physical addresses mapped to another "k" number of consecutive logical addresses that are numerically consecutive to the "i" logical addresses when the "i" number of logical addresses are numerically consecutive to the "k" logical addresses.

13. The operation method according to claim 12, further comprising determining validity of data pre-read from the pre-read area based on a subsequent search result.

14. The operation method according to claim 13, wherein the determining of the validity comprises determining whether a first "k-i" number of physical addresses among the subsequently searched "k" physical addresses coincide with the first read-estimated physical addresses.

15. The operation method according to claim 12, further comprising:
    transmitting a second pre-read command along with second pre-read physical addresses for access to a second pre-read memory area, wherein the second pre-read physical addresses include "i" number of physical addresses subsequent to a first "k-i" number of physical addresses among the subsequently searched "k" physical addresses and one or more second read-estimated physical addresses numerically consecutive to the "i" physical addresses that are subsequent to the first "k-i" number of physical addresses.

16. A data storage device comprising:
    a controller suitable for:
    searching for a first physical address mapped to a read-requested first logical address,
    determining whether a second logical address is numerically consecutive to the first logical address, wherein the second logical address is mapped to a second physical address that is numerically consecutive to the first physical address, and
    transmitting a first pre-read command along with the second physical address for access to a first pre-read memory area when the second logical address is numerically consecutive to the first logical address; and
    a first memory apparatus suitable for performing a read operation to the first pre-read memory area in response to the first pre-read command and the second physical address,
    wherein, when the second logical address is numerically consecutive to the first logical address, the controller further:
    subsequently searches for a third physical address mapped to a third logical address that is numerically consecutive to the second logical address, and
    determines validity of data pre-read from the first pre-read area based on a subsequent search result.

17. The data storage device according to claim 16, further comprising a second memory apparatus,
    wherein the controller further transmits a normal read command along with the first physical address for access to a normal memory area of the second memory apparatus.

18. The data storage device according to claim 16, wherein the first pre-read memory area corresponds to the second physical address and physical addresses numerically consecutive to the second physical address.

19. The data storage device according to claim 16, wherein the controller further transmits a second pre-read command along with a fourth physical address, subsequent to the third physical address, for access to a second pre-read memory area, wherein the second pre-read memory area corresponds to the fourth physical address and physical addresses numerically consecutive to the fourth physical address.

* * * * *